(12) United States Patent
Kimura et al.

(10) Patent No.: US 8,616,619 B2
(45) Date of Patent: Dec. 31, 2013

(54) CONSTRUCTION MACHINE

(75) Inventors: Shougo Kimura, Ritto (JP); Hajime Ishii, Higashiomi (JP); Hiroshi Tabeta, Konan (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/498,235

(22) PCT Filed: Mar. 11, 2011

(86) PCT No.: PCT/JP2011/055799
§ 371 (c)(1),
(2), (4) Date: Mar. 26, 2012

(87) PCT Pub. No.: WO2011/125415
PCT Pub. Date: Oct. 13, 2011

(65) Prior Publication Data
US 2013/0017048 A1    Jan. 17, 2013

(30) Foreign Application Priority Data

Apr. 6, 2010 (JP) .................................. 2010-87719

(51) Int. Cl.
*B60H 1/22* (2006.01)
(52) U.S. Cl.
USPC .................. 296/190.09; 296/190.08; 296/208; 454/142; 454/144
(58) Field of Classification Search
USPC ............. 296/190.01, 190.04, 190.08, 190.09, 296/208; 180/89.12, 89.14; 454/103, 104, 454/141, 142, 144, 145
See application file for complete search history.

(56) References Cited

U.S. PATENT DOCUMENTS

| | | | |
|---|---|---|---|
| 4,120,527 A * | 10/1978 | Lawrence | 296/190.09 |
| 4,494,597 A * | 1/1985 | Fukami et al. | 165/41 |
| 5,779,536 A * | 7/1998 | McCorkel et al. | 454/137 |
| 6,332,330 B1 * | 12/2001 | Loup et al. | 62/244 |
| 8,459,727 B2 * | 6/2013 | Mayr et al. | 296/190.09 |
| 2006/0170251 A1 | 8/2006 | Ishii et al. | |
| 2010/0102594 A1 | 4/2010 | Kimura et al. | |

FOREIGN PATENT DOCUMENTS

| | | | |
|---|---|---|---|
| JP | 61191732 A * | 8/1986 | |
| JP | 2001-071736 A | 3/2001 | |
| JP | 2007-196944 A | 8/2007 | |
| WO | WO 2004/078562 A1 | 9/2004 | |
| WO | WO 2009/022510 A1 | 2/2009 | |

\* cited by examiner

*Primary Examiner* — Dennis Pedder
*Assistant Examiner* — Jason S Daniels
(74) *Attorney, Agent, or Firm* — Mattingly & Malur, PC

(57) ABSTRACT

A suction duct (19) provided in a floor member (9) comprises an internal air duct portion (20) connected to the internal air inlet port (10A3), an external air duct portion (21) connected to an external air inlet port (10E3), and a common duct portion (22) for connecting the internal air duct portion (20) and the external air duct portion (21) to a blower fan 18B suction side of an air conditioner unit (18). The suction duct is constructed to form a hollow column (23) having a hollow closed section structure with the internal air duct portion and the common duct portion formed integrally in the upper and lower directions. Therefore, the hollow column formed of the hollow closed section structure can increase strength of the floor member as a strong column while circulating internal air between the internal air inlet port and the air conditioner unit.

4 Claims, 14 Drawing Sheets

[//]: # (Column 1)

CONSTRUCTION MACHINE

TECHNICAL FIELD

The present invention relates to a construction machine such as a hydraulic excavator equipped with an air conditioner unit on a floor member thereof.

BACKGROUND ART

In general, a hydraulic excavator as a construction machine largely constituted by an automotive lower traveling structure, an upper revolving structure swingably mounted on the lower traveling structure, and a working mechanism liftably mounted at the front side of the upper revolving structure.

The upper revolving structure is provided with a revolving frame serving as a support structure, a floor member provided on the revolving frame and having an operator's seat mounting section at the rear side for mounting an operator's seat and having a foot rest section at the front side on which an operator rests his or her feet, a cab box provided to cover the periphery and the upper side of the floor member for forming an operator's room on the floor member, and an air conditioner unit provided at the lower surface side of the foot rest section for supplying conditioned air into the operator's room.

The floor member is provided with an internal air inlet port opened inside of the operator's room and an external air inlet port opened outside of the operator's room, and these inlet ports are connected through suction ducts to a suction side of the air conditioner unit. In this case, each duct is formed to have a large passage area, for example, through which air can smoothly circulate (for example, Patent Document 1).

PRIOR ART DOCUMENTS

Patent Documents

Patent Document 1: Japanese Patent Laid-Open No. 2001-071736 A

SUMMARY OF THE INVENTION

Incidentally, in the hydraulic excavator disclosed in Patent Document 1 as mentioned above, the duct is formed with the large passage area for the purpose that a resistance of the duct is reduced to be small and thereby air can smoothly flow therethrough. Therefore, a large space is necessary for disposing the duct. In consequence, in a case of providing the duct, there occurs a problem that a disposing position thereof is restricted due to a relation with peripheral devices and the duct or the peripheral device cannot be freely arranged.

In view of the above-discussed problems with the conventional art, it is an object of the present invention to provide a construction machine in which a limited space of an upper revolving structure can be effectively used by increasing strength of a suction duct.

(1) A construction machine according to the present invention comprises an automotive lower traveling structure, an upper revolving structure swingably mounted on the lower traveling structure, and a working mechanism liftably mounted to the upper revolving structure, wherein the upper revolving structure is provided with a revolving frame serving as a support structure, a floor member provided on the revolving frame and having an operator's seat mounting section at the rear side for mounting an operator's seat and having a foot rest section at the front side on which an operator rests his or her feet, a cab box provided to cover the periphery and the upper side of the floor member for forming an operator's room on the floor member, and an air conditioner unit provided at the lower surface side of the foot rest section to suck in internal air from an internal air inlet port opened inside of the operator's room or suck in external air from an external air inlet port opened outside of the operator's room for forming conditioned air which is supplied into the operator's room.

The construction which the present invention adopts is characterized in that a suction duct is provided in the operator's seat mounting section of the floor member for circulating air toward a suction side of the air conditioner unit from the internal air inlet port and the external air inlet port, the suction duct comprises an internal air duct portion connected to the internal air inlet port, an external air duct portion connected to the external air inlet port, and a common duct portion for connecting the internal air duct portion and the external air duct portion to the suction side of the air conditioner unit, and the suction duct is formed to have a hollow closed section structure with the internal air duct portion and the common duct portion formed integrally in the upper and lower directions.

With this arrangement, since the suction duct is constructed to have the hollow closed section structure provided with the internal air duct portion and the common duct portion formed integrally in the upper and lower directions, the suction duct can connect the internal air inlet port to the suction side of the air conditioner unit, and on top of that, can enhance the strength of the floor member as a column. In consequence, one suction duct can be provided with two functions composed of an original function of the duct to circulate air from the internal air inlet port and the external air inlet port to the suction side of the air conditioner unit and a function of a strength member for increasing the strength of the floor member.

As a result, for example, since the strength member conventionally required for increasing the strength of the floor member can be omitted, the space for providing the strength member can be used as the arrangement space for the suction duct. Therefore, since the suction duct can be freely arranged in a position appropriate for use situations, the limited space of the upper revolving structure can be effectively used. Further, since the component number can be eliminated corresponding to the omission of the strength member, an improvement on assembly operability, downsizing and lightweighing of the upper revolving structure, and the like can be achieved.

(2) According to the present invention, the suction duct is constituted by a hollow column provided with the internal air duct portion and the common duct portion formed integrally, wherein the hollow column is provided with a hollow closed section structure formed by a front surface plate, a rear surface plate, a left surface plate, and a right surface plate, and the right surface plate is provided with an internal air inlet bore into which internal air flows, the left surface plate is provided with an external air inlet bore into which external air flows, and the front surface plate is provided with an air outlet bore at the lower side through which the internal air and the external air flow out.

With this arrangement, the hollow column provided with the hollow closed section structure formed by the front surface plate, the rear surface plate, the left surface plate, and the right surface plate can increase the strength of the floor member. The hollow column can flow both of the internal air and the external air inside the one hollow column and supply both of the air from the air outlet bore to the air conditioner unit.

(3) According to the present invention, the external air duct portion of the suction duct has a groove-shaped cross section, in which a surface opposing the operator's seat mounting section of the floor member is opened, and is attached to the operator's seat mounting section to form a hollow closed section structure together with the operator's seat mounting section.

With this arrangement, the external air duct portion of the suction duct having the groove-shaped section configuration can be fixed to the operator's seat mounting section of the floor member to form the hollow closed section structure together with the operator's seat mounting section. Therefore, the external air inlet port can be connected to the suction side of the air conditioner unit, and further, the strength of the floor member can be increased together with the internal air duct portion and the common duct portion. In addition, since the operator's seat mounting section is used as one face for forming the hollow closed section structure, the external air duct portion can be decreased in weight.

(4) According to the present invention, the operator's seat mounting section of the floor member includes a front plate extending from a rear portion of the foot rest section to an upper side and a mounting plate extending from an upper portion of the front plate to a rear side for mounting the operator's seat, and the suction duct is provided with an extending portion extending from the internal air duct portion to a rear side for supporting the mounting plate from the lower side.

With this arrangement, the extending portion can increase the strength of the mounting plate on which large loads by the operator's seat, various types of levers, an operator and the like are applied, and these components can be stably supported.

(5) According to the present invention, the floor member is provided to be capable of tilting up and down to the revolving frame at a front side position as a tilting fulcrum, and the suction duct tilts together with the floor member.

With such a construction, the floor member can tilt up and down to the revolving frame by using the front side position as the tilting fulcrum. Since the suction duct tilts together with the floor member at this time, strength of the floor member against bending or twisting at tilting can be increased.

BRIEF DESCRIPTION OF THE DRAWINGS

FIG. 5 is an external perspective view showing the floor member, an operator's seat, various types of levers, a pedal, and the like.

MODE FOR CARRYING OUT THE INVENTION

Hereinafter, a construction machine to be applied to an embodiment in the present invention will be in detail explained with reference to FIG. 1 to FIG. 14, by taking a cab-furnished type hydraulic excavator as an example.

Figure 1:
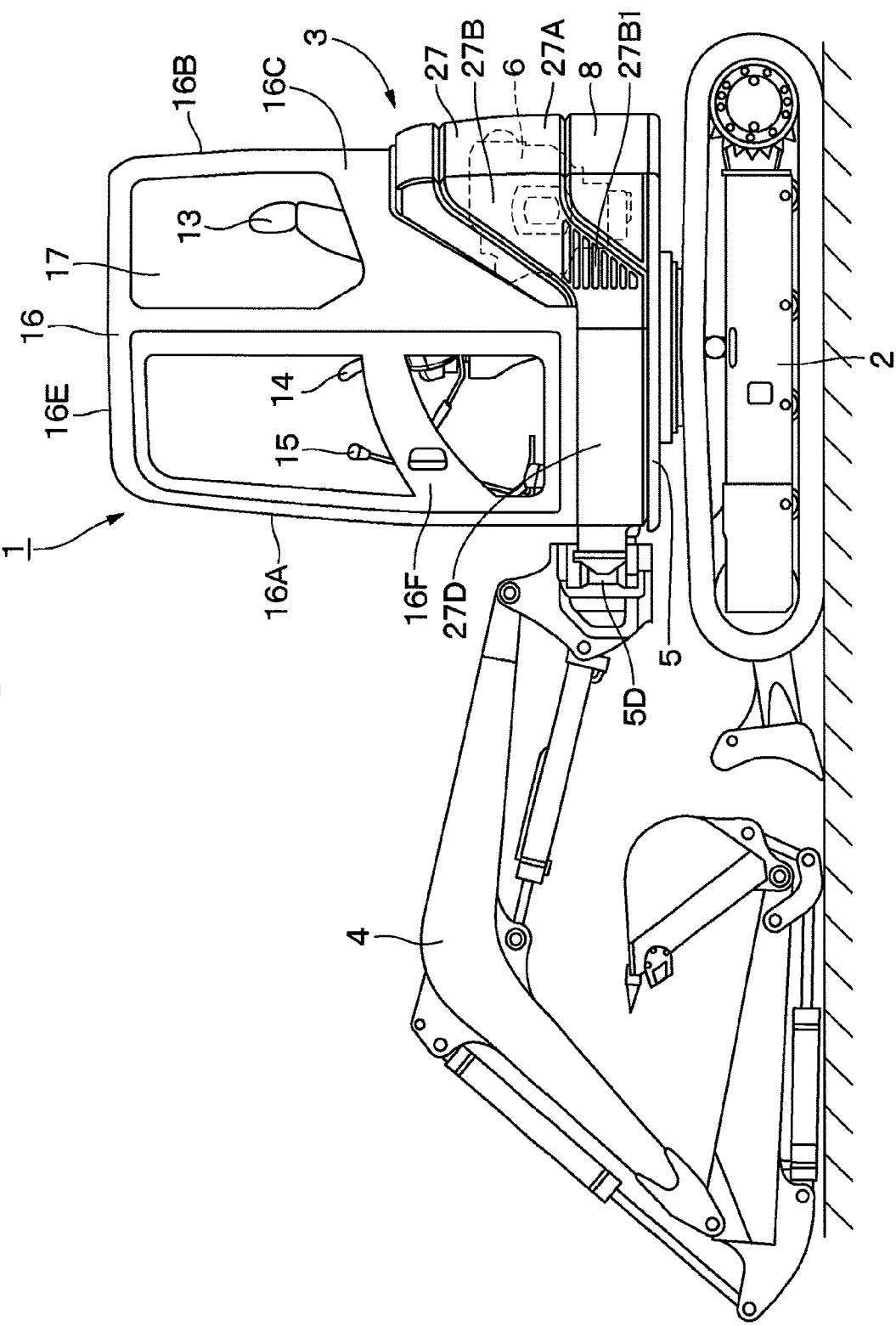
FIG. 1 is a front view showing a hydraulic excavator which is applied to an embodiment of the present invention.

In FIG. 1, described at 1 is a cab-furnished type hydraulic excavator known as a construction machine to be applied to the present embodiment, and the hydraulic excavator 1 is a small-sized hydraulic excavator called a mini excavator suitable for an operation at a narrow working site. The hydraulic excavator 1 is largely constituted by an automotive lower traveling structure 2, an upper revolving structure 3 which is swingably mounted on the lower traveling structure 2, and a working mechanism 4 provided at the front side of the upper revolving structure 3 in the front and rear directions for performing an excavating operation of earth and sand.

Figure 2:
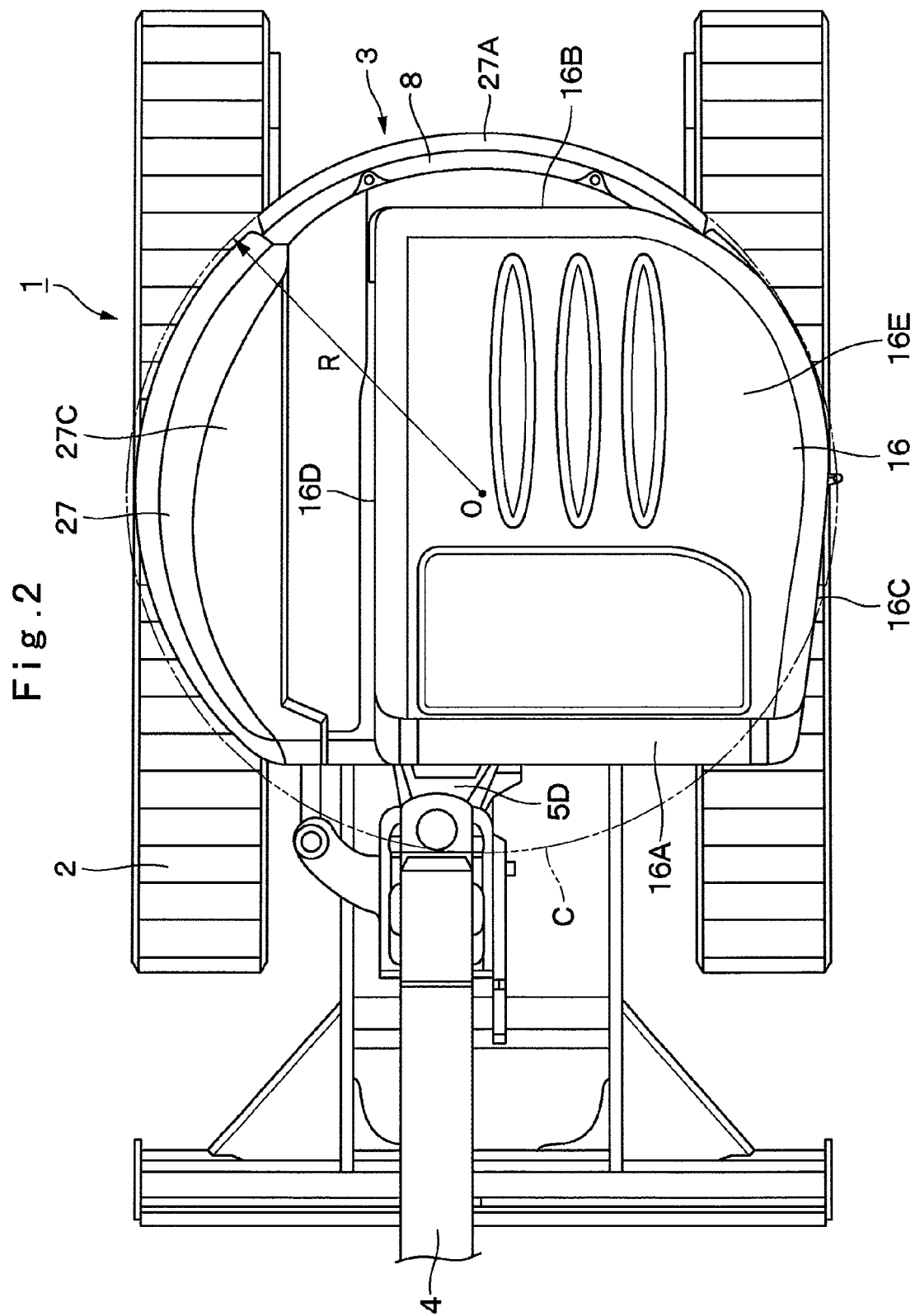
FIG. 2 is a plan view showing the enlarged hydraulic excavator.

As shown in FIG. 2, the upper revolving structure 3 has a width dimension in the right and left directions substantially equal to a vehicle width of the lower traveling structure 2 and is formed in a substantially circular shape as viewed from above in such a manner as to be accommodated in an imaginary circle C of a revolving radius R centering at a revolving center O. In consequence, the hydraulic excavator 1 is constructed as a backward-small revolving type hydraulic excavator in which, when the upper revolving structure 3 revolves around the revolving center O on the lower traveling structure 2, a rear surface of a counterweight 8 to be described hereinafter is accommodated substantially in the vehicle width of the lower traveling structure 2.

In this case, the aforementioned revolving radius R is defined by a distance from the revolving center O to the rear surface of the counterweight 8, and the aforementioned imaginary circle C is a track of the rear surface of the counterweight 8 at the revolving of the upper revolving structure 3. Namely, a projection amount of the imaginary circle C is a slight dimension (for example, thereabout 10 to 30 mm at one side in the vehicle width direction) in the vehicle width direction of the lower traveling structure 2.

The upper revolving structure 3 is constituted by a revolving frame 5, the counterweight 8, a floor member 9, an operator's seat 13, a cab box 16, an air conditioner unit 18, and a suction duct 19, which will be described hereinafter, and the like.

Figure 3:
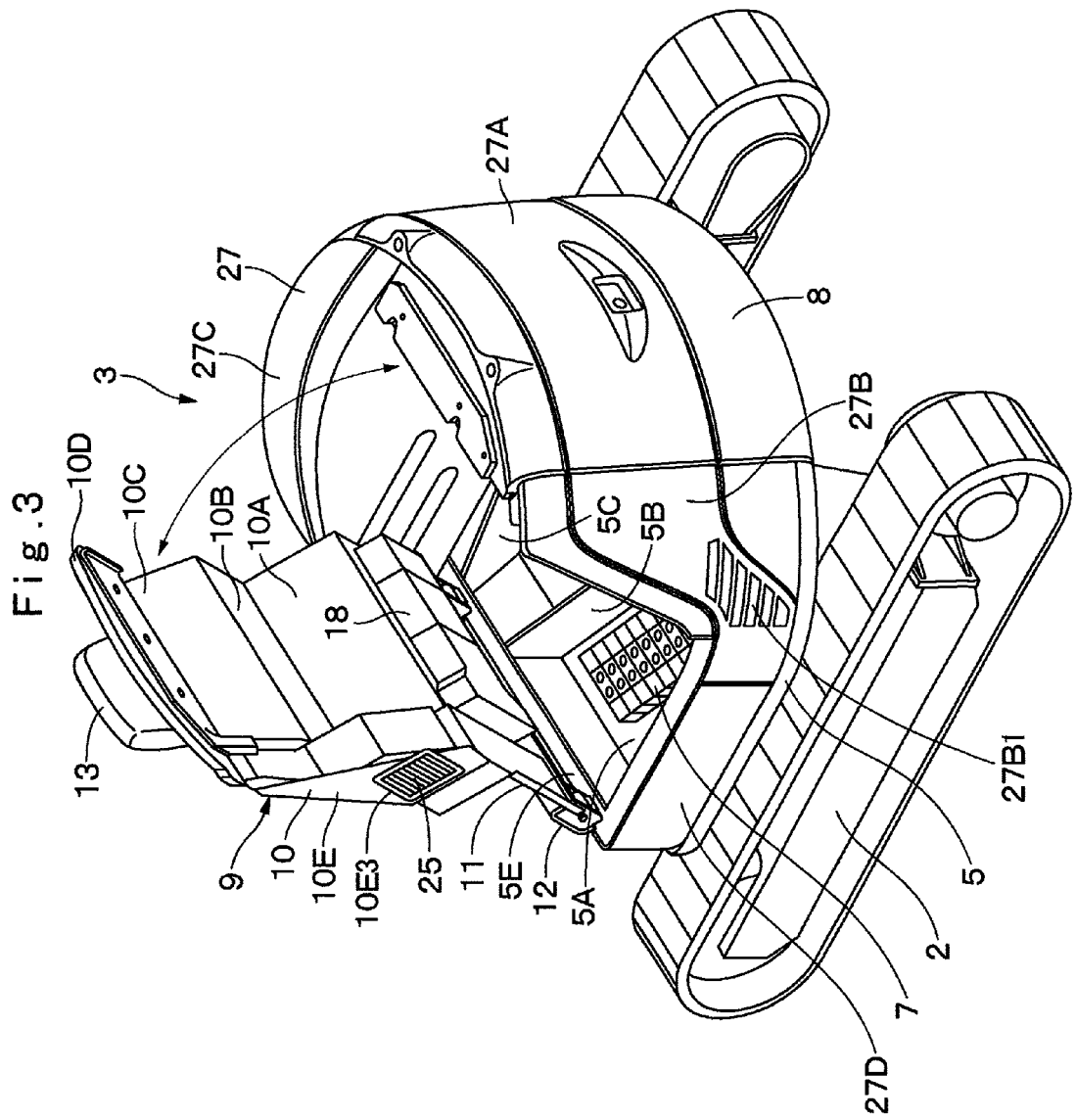
FIG. 3 is an external perspective view of the hydraulic excavator taken from a rear side in a state where a floor member tilts up, with a working mechanism and a cab box being removed.

Denoted at 5 is the revolving frame which serves as a support structure of the upper revolving structure 3. As shown in FIG. 3, the revolving frame 5 is largely constituted by a flat bottom plate 5A extending in the front and rear directions at the intermediate portion in the right and left directions, left and right vertical plates 5B and 5C provided upright in a substantially V-letter shape on an upper surface side of the bottom plate 5A to be spaced apart in the right and left directions, a support bracket 5D provided in front end portions of the respective vertical plates 5B and 5C for supporting the working mechanism 4 (shown in FIG. 1 and FIG. 2), and a front beam 5E which is positioned at the left front portion to extend in the right and left directions and on which a front side portion of the floor member 9 to be described hereinafter is mounted.

Indicated at 6 is the engine provided at the rear side in the revolving frame 5 (shown in a dotted line of FIG. 1), and the engine 6 drives and rotates a hydraulic pump. A control valve device 7 (refer to FIG. 3) is mounted at the left front side in the revolving frame 5, and the control valve device 7 is mounted on the bottom plate 5A to be positioned at the left side to the left vertical plate 5B of the revolving frame 5.

Indicated at 8 is the counterweight provided in the rear portion of the revolving frame 5, and the counterweight 8 acts as a weight balance to the working mechanism 4. Here, the counterweight 8 is formed to be bent in an arc shape in such a manner as to cover the engine 6 from the rear side. On the other hand, the counterweight 8 serves as a supporting structural member for mounting a fixing plate 10D of an operator's seat mounting section 10 constituting the floor member 9 to be described hereinafter, to the side of the revolving frame 5.

Figure 4:
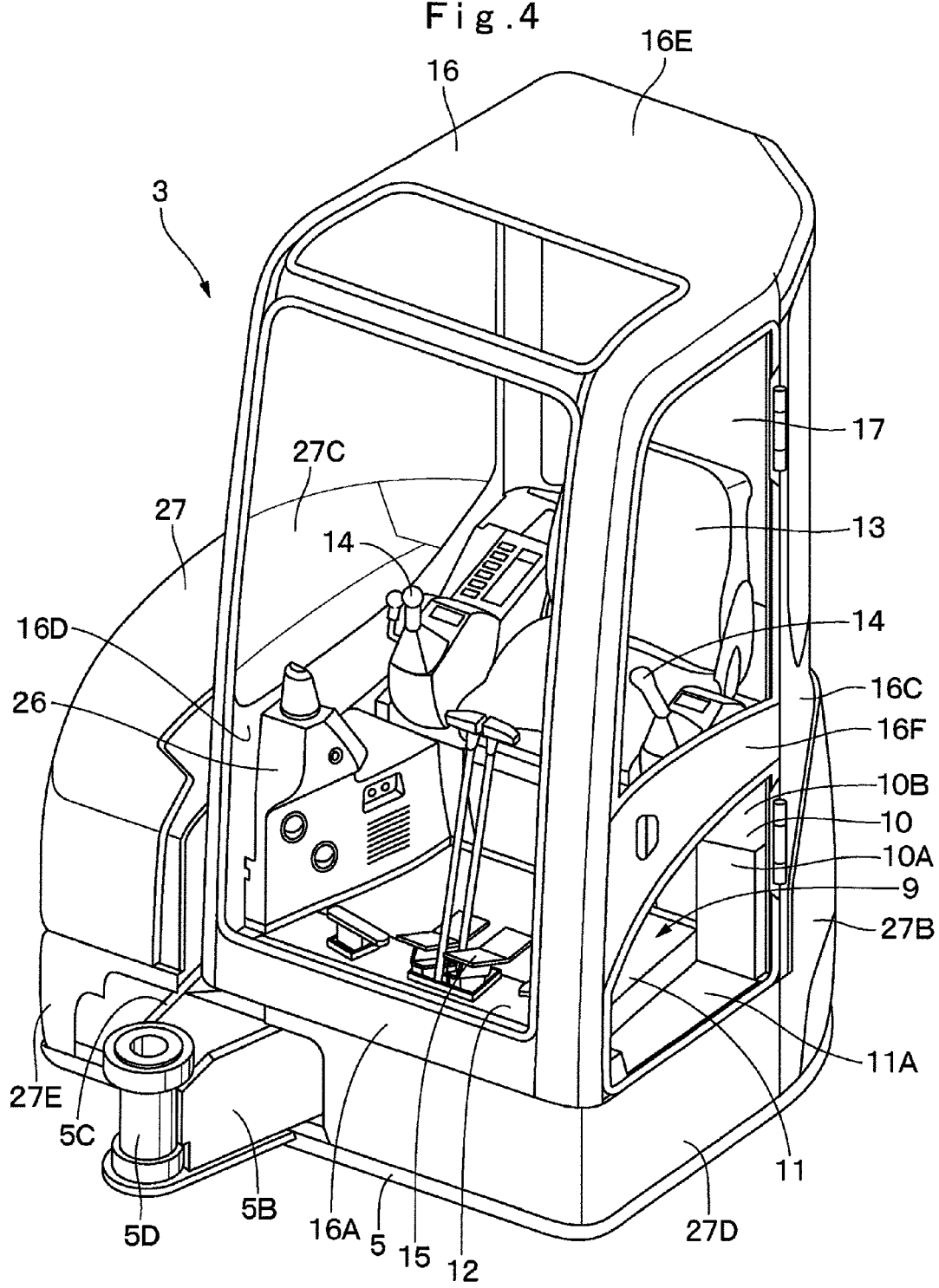
FIG. 4 is an enlarged external perspective view showing an upper revolving structure from a front side.

As shown in FIG. 4, designated at 9 is the floor member provided in a position closer to the left side on the revolving frame 5. The floor member 9 has a front position liftably supported in the front position of the revolving frame 5 and a rear position supported on the upper portion of the counterweight 8. Therefore, the floor member 9 can tilt up (state of FIG. 3) and down (state of FIG. 1) together with the operator's seat 13, the cab box 16, the air conditioner unit 18, the suction duct 19, and the like by using the front position as a fulcrum. When the floor member 9 tilts down, the fixing plate 10D at the rear position thereof is supported on the counterweight 8 in a vibration isolation state. Further, as shown in FIG. 5 to FIG. 8, the floor member 9 is largely constituted by the operator's seat mounting section 10 and the foot rest section 11, which will be described hereinafter.

Figure 7:
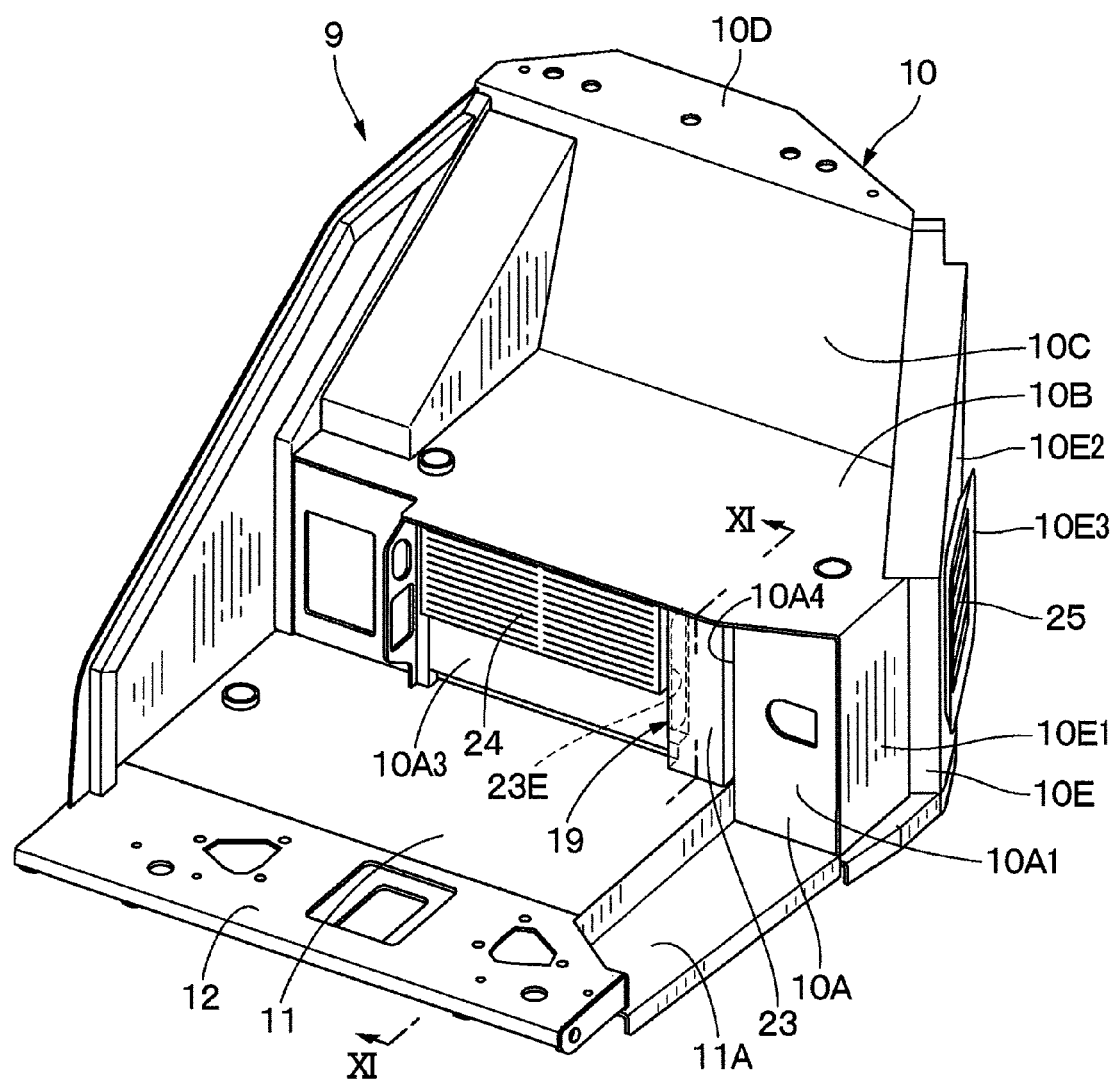
FIG. 7 is an external perspective view showing the floor member in a state where filters being attached to respective inlet ports.
Figure 8:
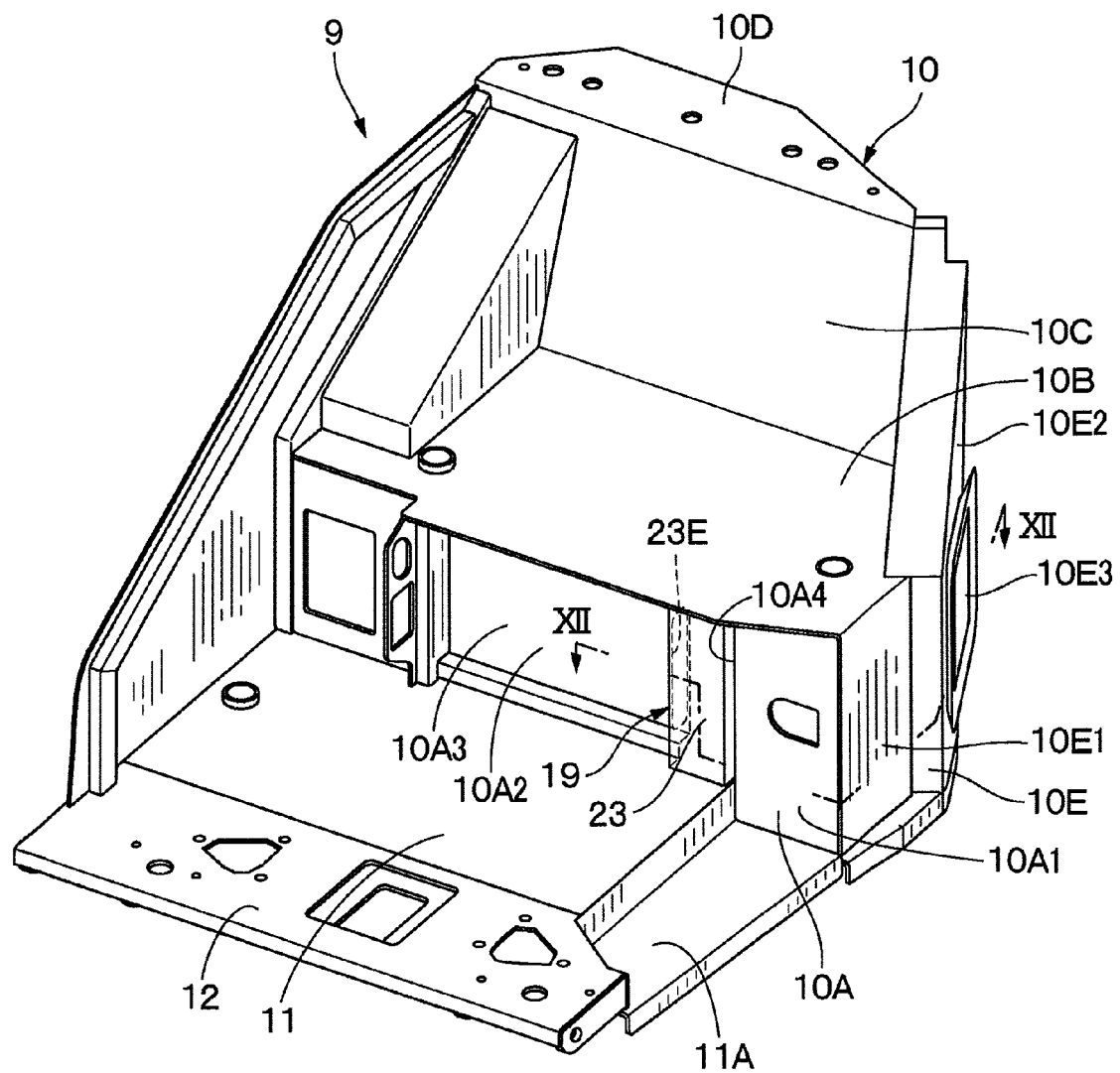
FIG. 8 is an external perspective view showing the floor member as a single unit.

Denoted at 10 is the operator's seat mounting section positioned at the backside of the floor member 9 and formed in a step shape, and the operator's seat mounting section 10 is provided with the operator's seat 13 mounted thereon. As shown in FIG. 7 and FIG. 8, the operator's seat mounting section 10 is largely constituted by a front plate 10A extending from a rear portion of the foot rest section 11 to the upper side, a substantially flat mounting plate 10B extending from an upper portion of the front plate 10A to the rear side for mounting the operator's seat 13, a back plate 10C extending from a rear portion of the mounting plate 10B to the upper side, a fixing plate 10D extending from an upper portion of the back plate 10C to the rear side, and a left surface plate 10E extending from the front plate 10A to the rear side along the left end edges of the mounting plate 10B and the back plate 10C.

Figure 9:
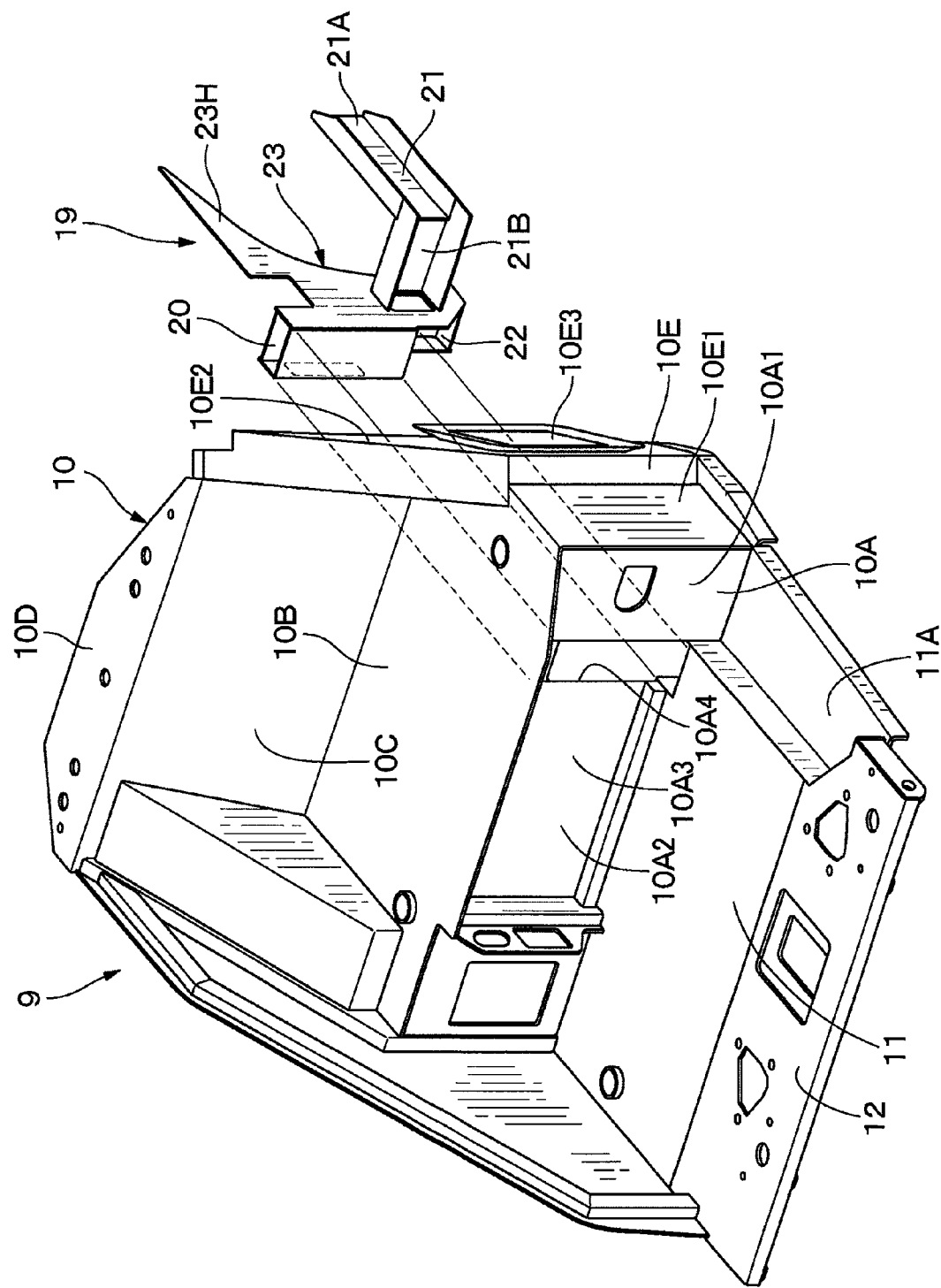
FIG. 9 is an exploded perspective view showing the floor member and the suction duct in a state of being exploded from the front and upper side.
Figure 10:
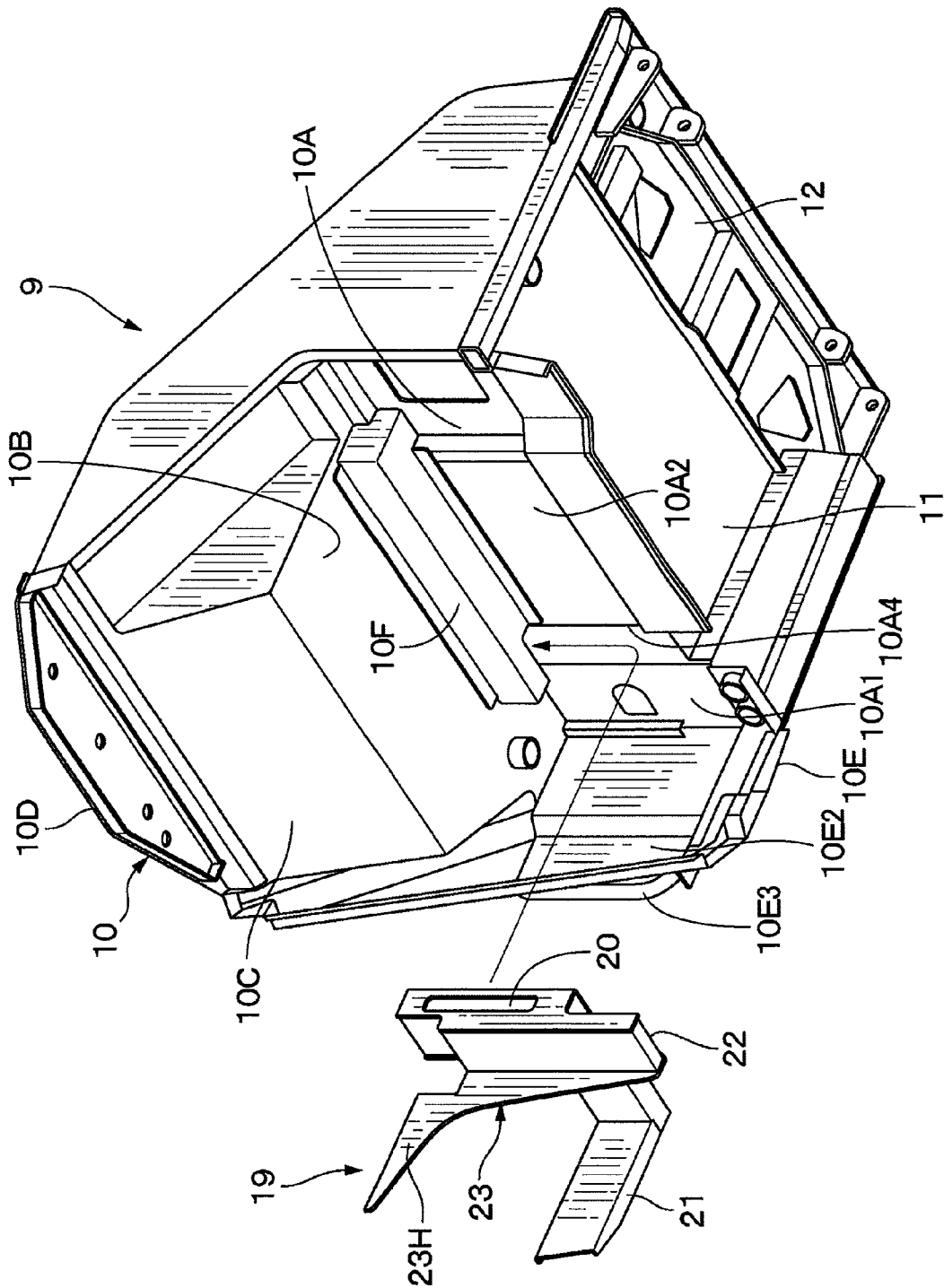
FIG. 10 is an exploded perspective view showing the floor member and the suction duct in a state of being exploded from the rear and lower side.

Here, the front plate 10A of the operator's seat mounting section 10 is provided with a left front surface portion 10A1 arranged at the left position under a left operating lever 14 to be described hereinafter, a central front surface portion 10A2 wider in the right and left directions to be positioned in the center and arranged in a position closer to the rear side than the left front surface portion 10A1, and an internal air inlet port 10A3 provided in front of the central front surface portion 10A2 and having the central front surface portion 10A2 as a rear wall portion for introducing air in the operator's room 17 as internal air. As shown in FIG. 9 and FIG. 10, a duct mounting opening 10A4 is formed in the front plate 10A to be positioned between the left front surface portion 10A1 and the central front surface portion 10A2 (internal air inlet port 10A3). The duct mounting opening 10A4 is provided for mounting a hollow column 23 forming an internal air duct portion 20 and a common duct portion 22 of the suction duct 19 to be described hereinafter and is formed as a groove-shaped opening extending in the upper and lower directions.

On the other hand, the left surface plate 10E of the operator's seat mounting section 10 is constituted by a front surface portion 10E1 positioned at the front side and extending substantially straight in the front and rear directions and a rear surface portion 10E2 positioned closer to the rear side than the front surface portion 10E1 and extending diagonally right and rear side. The rear surface portion 10E2 is provided with an external air inlet port 10E3 for introducing air outside of the operator's room 17 as external air. As shown in FIG. 1, the external air inlet port 10E3 is communicated with outside through a suction port 27B1 of an engine left cover 27B constituting an outer cover 27 to be described hereinafter.

Figure 6:
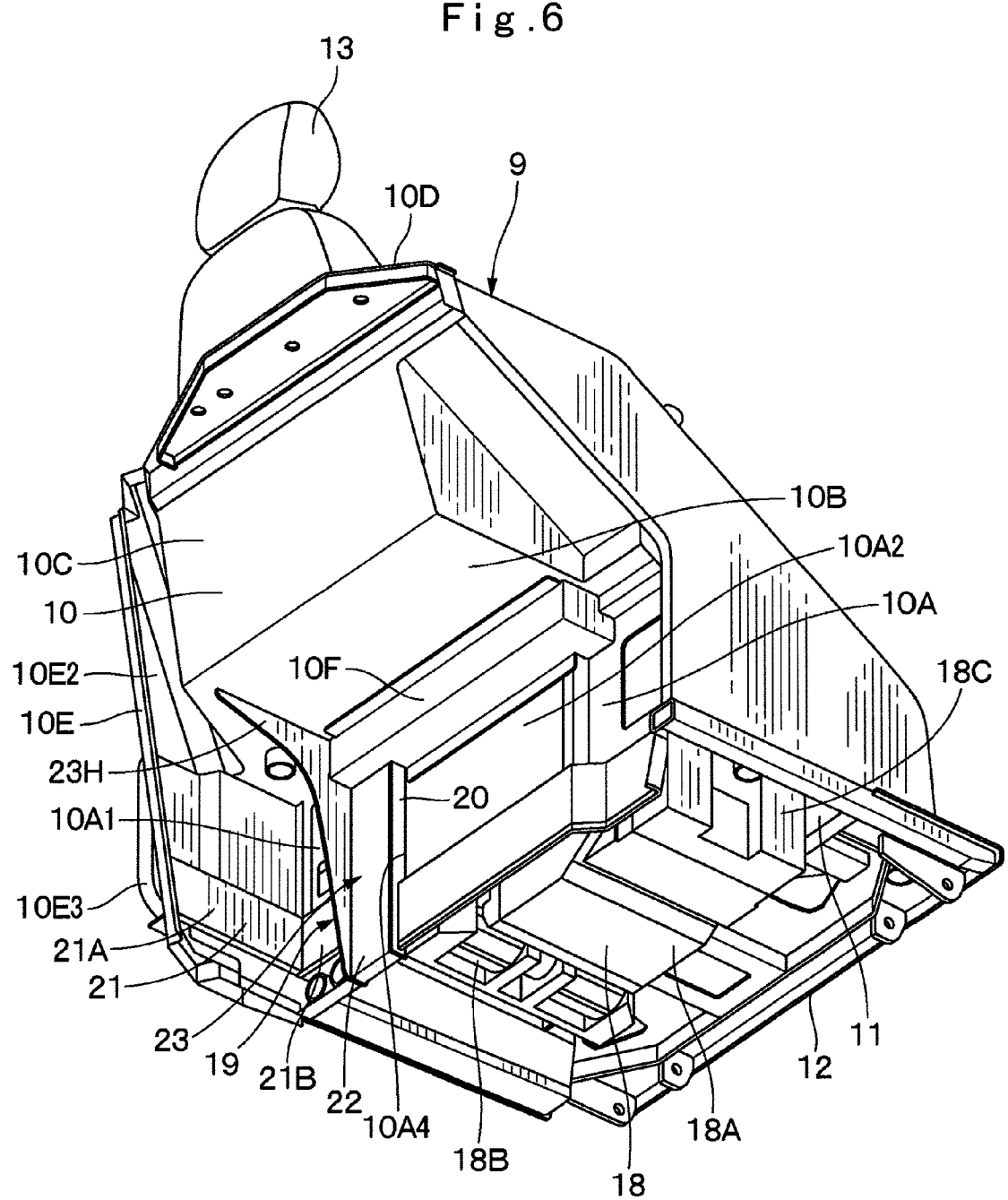
FIG. 6 is an external perspective view showing the floor member, a suction duct, the operator's seat, an air conditioner unit, and the like from the rear and lower side.

Further, as shown in FIG. 6 and FIG. 10, the operator's seat mounting section 10 is provided with a hose guide 10F mounted thereon to be positioned in a corner between a rear surface of the front plate 10A and a lower surface of the mounting plate 10B. The hose guide 10F serves to guide a pilot hose (not shown) connected to the operating lever 14 for working, and the like.

Denoted at 11 is the foot rest section of the floor member 9, and the foot rest section 11 is used for an operator seated on the operator's seat 13 to rest his or her feet on and is provided at the front side of the operator's seat mounting section 10. The foot rest section 11 is formed as a flat plate in a rectangular shape longer in the right and left directions. On the other hand, a left end of the foot rest section 11 which is at the side of a door 16F of the cab box 16 to be described hereinafter is used as a foot step section 11A in a step shape which an operator steps his or her feet on at the time of getting on/off the operator's room 17.

Denoted at 12 is a lever/pedal mounting section provided in front side of the foot rest section 11, and the lever/pedal mounting section 12 extends in the right and left directions along the front end of the foot rest section 11. The lever/pedal mounting section 12 is provided with an operating lever/pedal 15 for traveling mounted thereon to be described hereinafter, and the like.

Figure 5:
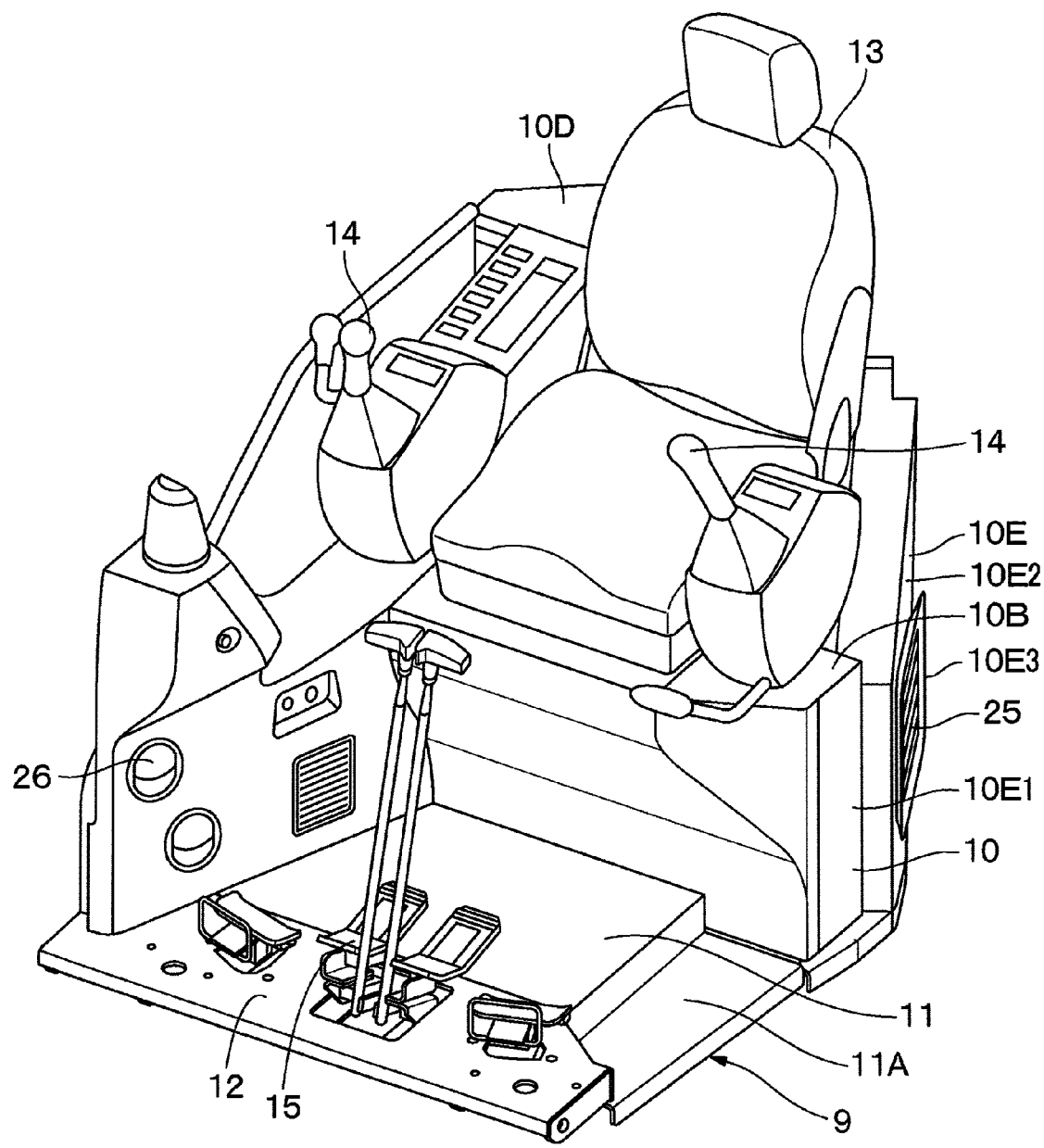

Indicated at 13 is the operator's seat provided on the floor member 9, and the operator's seat 13 is mounted in the central position of the mounting plate 10B constituting the operator's seat mounting section 10. The operator's seat 13 is used for an operator to be seated on at the time of operating the hydraulic excavator 1. As shown in FIG. 5, operating levers 14 for working are arranged in both of the right and left sides of the operator's seat 13 for operating the working mechanism 4 and the like. Further, the operating lever/pedal 15 for traveling which is operated by a manual operation or a foot depressing operation at the time of traveling the lower traveling structure 2, and the like is provided on the lever/pedal mounting section 12 in a position forward of the operator's seat 13.

Indicated at 16 is the cab box (refer to FIG. 4 and the like) provided on the floor member 9, and the cab box 16 covers the periphery and the upper side of the floor member 9 to be described hereinafter. The cab box 16 is formed in a boxy shape by a front surface portion 16A, a rear surface portion 16B, a left surface portion 16C, a right surface portion 16D and a top surface portion 16E, and a lower end portion thereof is mounted to a peripheral edge of the floor member 9. Therefore, the cab box 16 forms the operator's room 17, which is an occupancy space of an operator, on the floor member 9.

The door 16F which is positioned close to the front side corresponding to the foot rest section 11 of the floor member 9 is openably and closably provided on the left surface portion 16C. The door 16F opens/closes an entrance provided at the left side of the foot rest section 11.

Designated at 18 is the air conditioner unit (refer to FIG. 6) constituting an indoor device of an air conditioner, and the air conditioner unit 18 is mounted at the back side of the foot rest section 11 of the floor member 9. The air conditioner unit 18 sucks in internal air from the internal air inlet port 10A3 provided in the front plate 10A of the operator's seat mounting section 10 or external air from the external air inlet port 10E3 of the left surface plate 10E, which are supplied as conditioned air adjusted to a desired temperature and a desired humidity into the operator's room 17.

Figure 11:
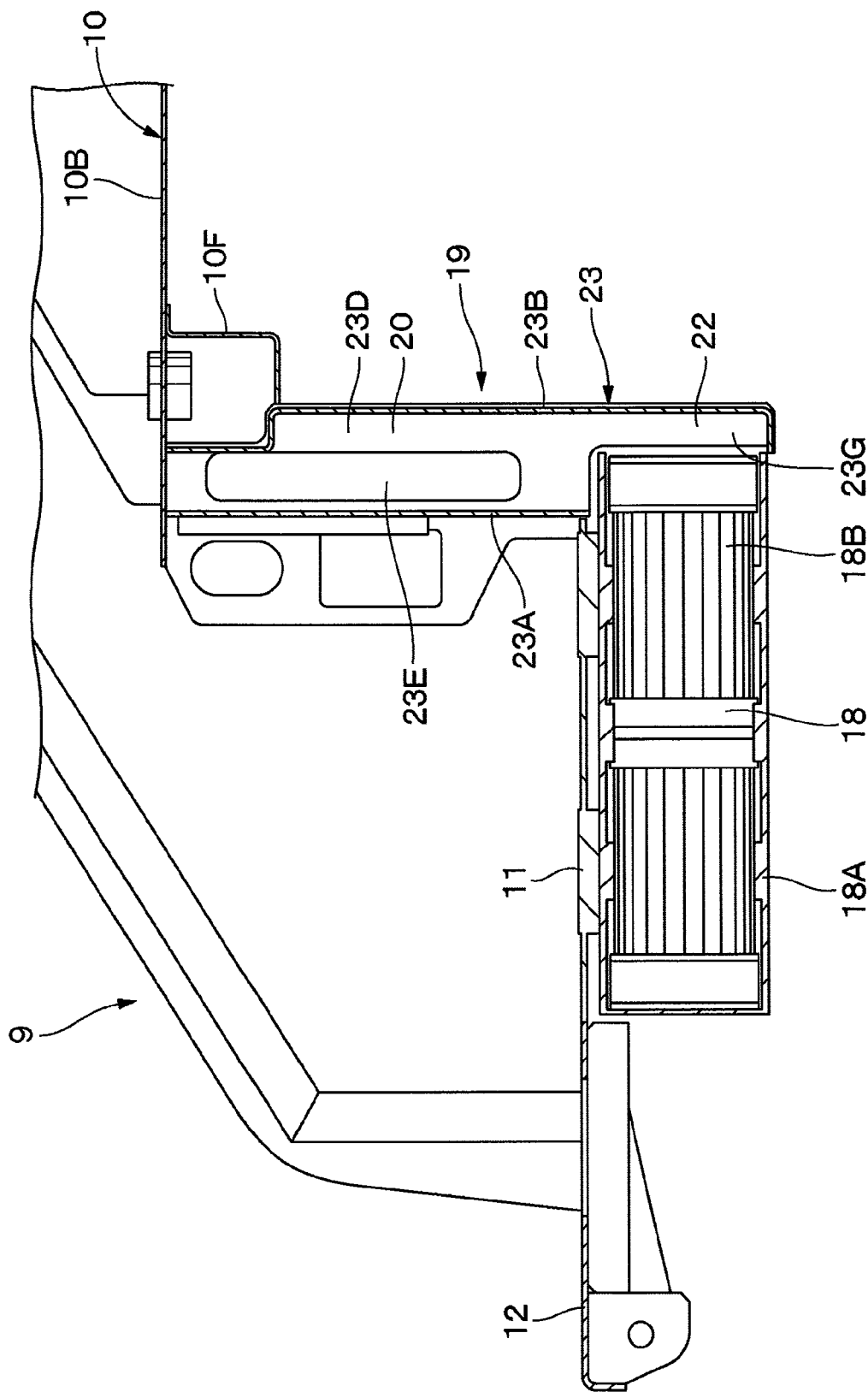
FIG. 11 is an enlarged cross-sectional view of essential portions showing the floor member, the air conditioner unit, and the suction duct, taken in the direction of arrows XI-XI in FIG. 7.

The air conditioner unit 18 accommodates an evaporator, a heater core (any thereof is not shown), and the like in the boxy casing 18A provided to extend in the right and left directions. As shown in FIG. 11, the air conditioner unit 18 has a blower fan 18B positioned at the left side in the casing 18A. Here, the blower fan 18B constitutes a suction side for sucking air into the air conditioner unit 18 and is arranged in front of the duct mounting opening 10A4 (common duct portion 22 to be described hereinafter) provided in the front plate 10A of the operator's seat mounting section 10. On the other hand, as shown in FIG. 6, the right side of the casing 18A is an outlet opening 18C for flowing out the conditioned air, and discharge ducts 26 to be described hereinafter are connected to the outlet opening 18C.

Next, the suction duct 19 is provided in the operator's seat mounting section 10 of the floor member 9 for supplying internal air or external air to the air conditioner unit 18, and the suction duct 19 serves also as a strength member for increasing strength of the floor member 9.

Namely, as shown in FIG. 6 to FIG. 14, designated at 19 is the suction duct provided in the operator's seat mounting section 10 of the floor member 9. The suction duct 19 serves to circulate air flown from the internal air inlet port 10A3 provided in the front plate 10A and the external air inlet port 10E3 provided in the left surface plate 10E of the operator's seat mounting section 10 toward the blower fan 18B of the air conditioner unit 18. In addition, the suction duct 19 is formed in a hollow closed section structure (box structure) by combining metallic plates, for example, to let air flows through.

The suction duct 19 is constituted by an internal air duct portion 20 connected to the internal air inlet port 10A3, an external air duct portion 21 connected to the external air inlet port 10E3, and a common duct portion 22 for connecting the internal air duct portion 20 and the external air duct portion 21 to the side of the blower fan 18B as the suction side of the air conditioner unit 18. Here, the internal air duct portion 20 and the common duct portion 22 are formed as a single column having sufficient strength.

Namely, denoted at 23 is a hollow column integrally forming the internal air duct portion 20 and the common duct portion 22. The hollow column 23 is formed in a substantially angular and tubular shape to extend in the upper and lower directions, thereby establishing a closed section structure an inside of which is hollow. In this case, the hollow closed section structure of the hollow column 23 is formed as a boxy strength member having a high strength resistance to deformation such as bending, twisting or the like by combining a plurality of metallic plates using bending work, welding work or the like.

Specially the hollow column 23 is largely constituted by a rectangular shaped front surface plate 23A extending in the upper and lower directions, a rear surface plate 23B facing the front surface plate 23A by a sufficient interval as much as to flow air between the front surface plate 23A and the rear surface plate 23B, a left surface plate 23C fixed to the front surface plate 23A and the rear surface plate 23B in such a manner as to close the left side therebetween, a right surface plate 23D fixed to the front surface plate 23A and the rear surface plate 23B in such a manner as to close the right side therebetween.

The right surface plate 23D of the hollow column 23 is provided with a rectangular shape internal air inlet bore 23E formed therein over an intermediate portion in the upper and lower directions to the upper side, and the internal air inlet bore 23E is communicated with the internal air inlet port 10A3 of the front plate 10A. On the other hand, the left surface plate 23C is provided with a rectangular shaped external air inlet bore 23F formed in a position lower than the internal air inlet bore 23E, and the external air inlet bore 23F is communicated with the external air inlet port 10E3 of the left surface plate 10E through the external air duct portion 21 to be described hereinafter. A position lower than the lower end of the front surface plate 23A is formed as an air outlet bore 23G opened to the front side, and the air outlet bore 23G flows out air toward the blower fan 18B of the air conditioner unit 18.

Next, each range of the internal air duct portion 20 and the common duct portion 22 formed in the hollow column 23 will be explained. First, the internal air duct portion 20 is formed in a range extending in the upper and lower directions within the internal air duct portion 20 between the vicinity of the internal air inlet bore 23E connected to the internal air inlet port 10A3 and the vicinity of the external air inlet bore 23F. Besides, the common duct portion 22 is positioned at the lower side in the hollow column 23 and is formed in a range from the vicinity of the external air inlet bore 23F to the air outlet bore 23G.

Here, since the hollow column 23 has a hollow closed section structure composed of the internal air duct portion 20 and the common duct portion 22 formed integrally in the upper and lower directions, the hollow column 23 can flow circulate air between the internal air inlet port 10A3 as a duct for air conditioning and a suction port of the blower fan 18B in the air conditioner unit 18. Further, the hollow column 23 having the hollow closed section structure is attached to the duct mounting opening 10A4 formed in the operator's seat mounting section 10 of the floor member 9 and fixed thereto by using a means such as welding, screwing or the like, thereby making it possible to increase the strength of the floor member 9 as a strength member.

Further, the hollow column 23 is provided with an extending portion 23H extending from an upper portion of the left surface plate 23C positioned in the internal air duct portion 20 to the rear side. The extending portion 23H supports the mounting plate 10B of the operator's seat mounting section 10 from the lower side, and an upper end edge thereof is fixed to a lower surface of the mounting plate 10B. In addition, the extending portion 23H is formed in a substantially triangular shape to taper off in such a manner that stress concentration does not occur at the time of bearing loads of the operator's seat 13, the operating lever 14, and the like, which are mounted on the mounting plate 10B. Therefore, the extending portion 23H can stably bear large loads applied by the operator's seat 13, the operating lever 14, the operator, and the like while preventing deformation of the mounting plate 10B.

On the other hand, the external air duct portion 21 is positioned at the left side to extend in the front and rear directions and is formed as an L-letter shaped structure as a whole. Namely, the external air duct portion 21 is formed in an L-letter shape by a first groove member 21A having a groove configuration in section (U-letter shape in section), of which a left surface facing the left surface plate 10E of the operator's seat mounting section 10 is opened and a second groove member 21B having a groove configuration in section and provided to extend in the right direction from a front end portion of the first groove member 21A, of which a front surface facing the front plate 10A of the operator's seat mounting section 10 is opened. Further, a rear end portion (inlet side of external air) of the first groove member 21A is fixed to the external air inlet port 10E3 of the left surface plate 10E and a right end portion (outlet side of external air) of the second groove member 21B is integrally fixed to the left surface plate 23C of the hollow column 23 in such a manner as to surround the external air inlet bore 23F.

Here, the external air duct portion 21 is closed by the left surface plate 10E and the front plate 10A in the operator's seat mounting section 10 in a state of being fixed to the operator's seat mounting section 10 by a means such as welding, screwing or the like, thus forming an air passage therein. In this case, the external air duct portion 21 includes the groove members 21A and 21B each sized such that air can smoothly circulate in the air passage having a sufficient passage area. Namely, the external air duct portion 21 is constructed such that the first groove member 21A is attached to an inner surface of the left surface plate 10E in the operator's seat mounting section 10 and the second groove member 21B is attached to an inner surface of the left front surface plate 10A1 of the front plate 10A in the operator's seat mounting section 10, thus making it possible to form a hollow closed section structure together with the operator's seat mounting section 10.

In consequence, since the external air duct portion 21 forms the hollow closed section structure together with the operator's seat mounting section 10, air can be circulated between the external air inlet port 10E3 as the duct for air conditioning and the suction port of the blower fan 18B in the air conditioner unit 18. Further, since the external air duct portion 21 forms the hollow closed section structure between the front plate 10A and the left surface plate 10E of the operator's seat mounting section 10, the external air duct portion 21 can increase each strength of the front plate 10A and the left surface plate 10E in the operator's seat mounting section 10, and the like as the strength member.

Figure 12:
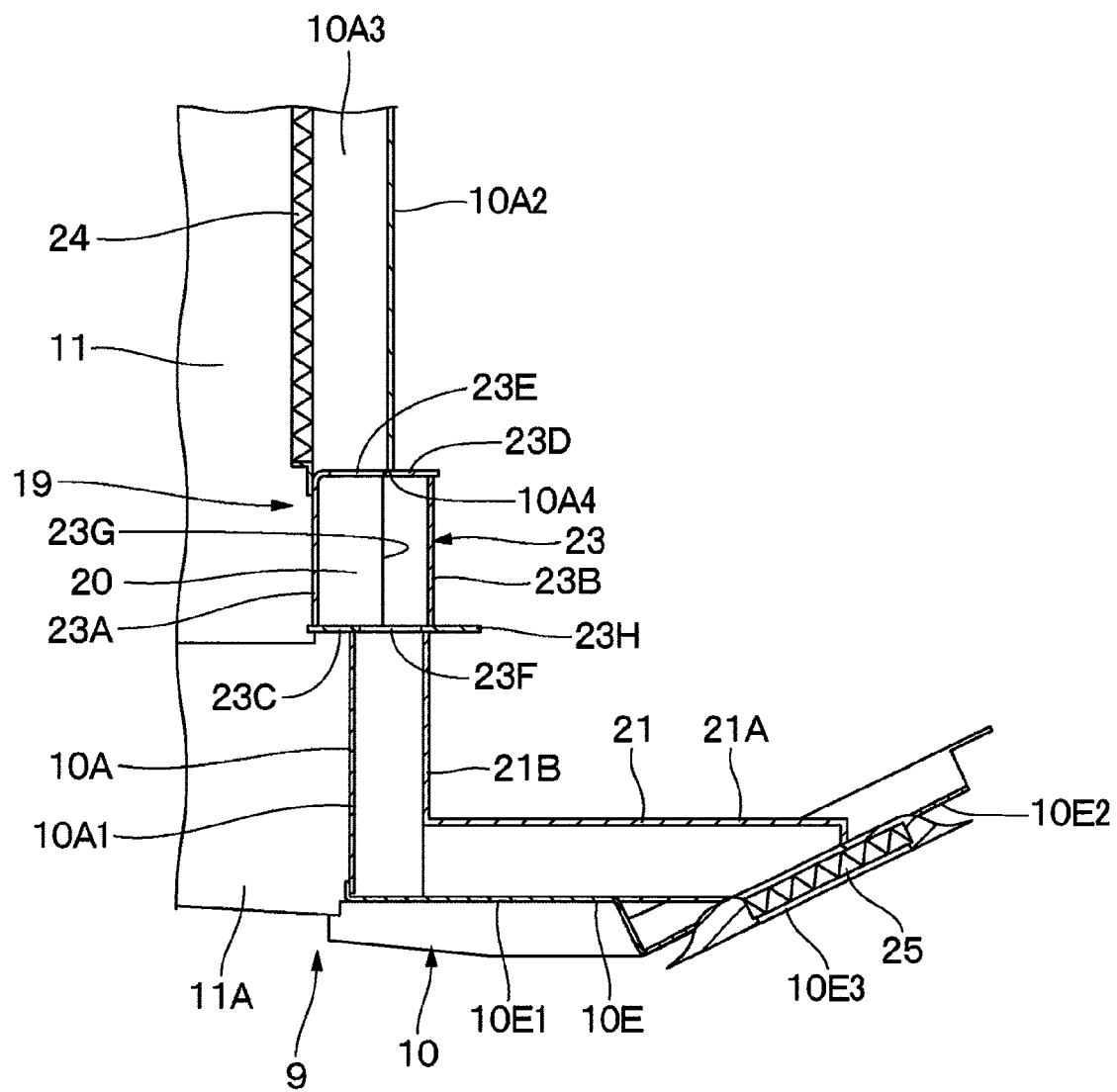
FIG. 12 is an enlarged cross-sectional view of essential portions showing the floor member, each filter, and the suction duct, taken in the direction of arrows XII-XII in FIG. 8.
Figure 13:
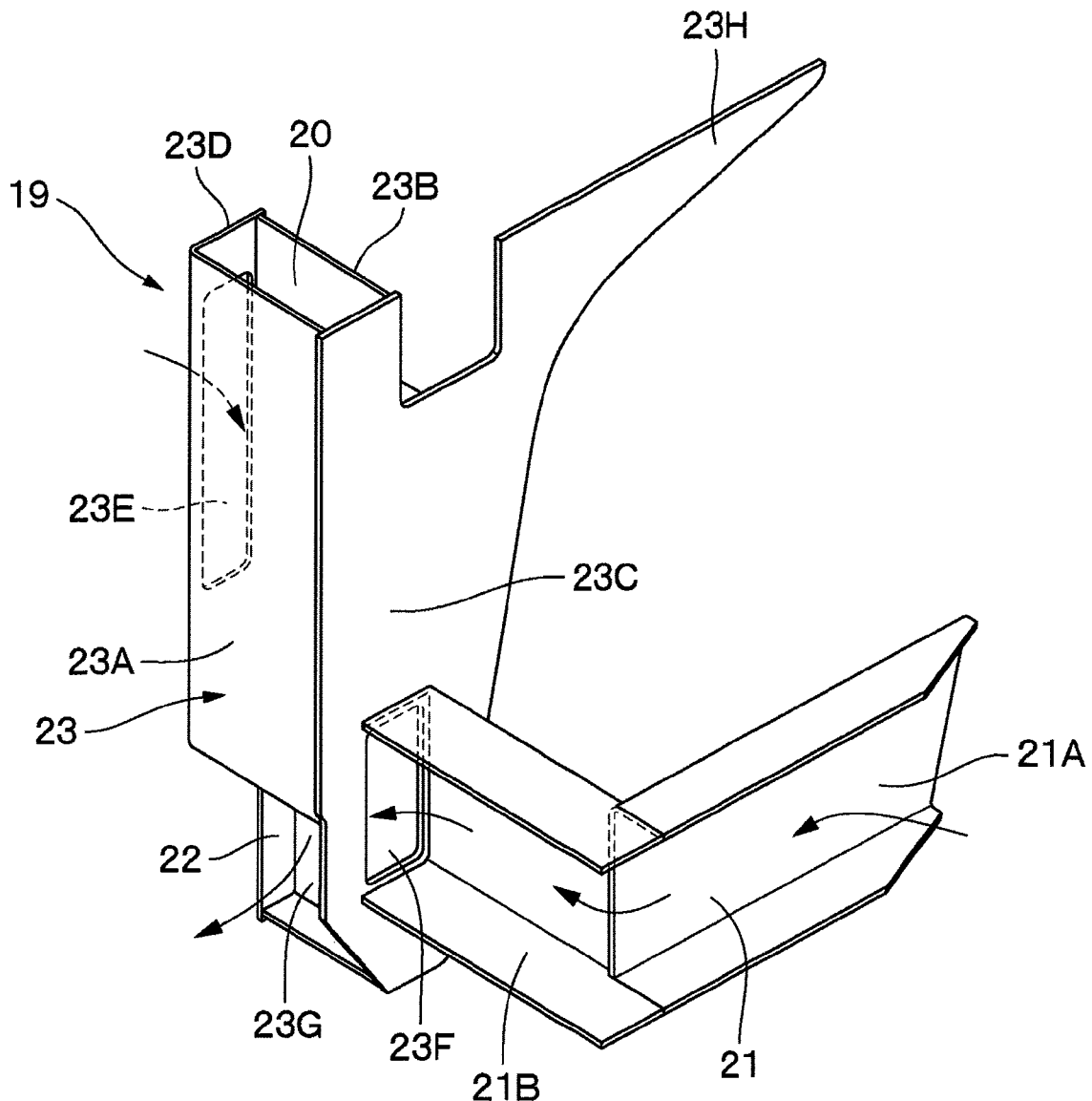
FIG. 13 is an external perspective view showing the suction duct as a single unit from the front and upper side.
Figure 14:
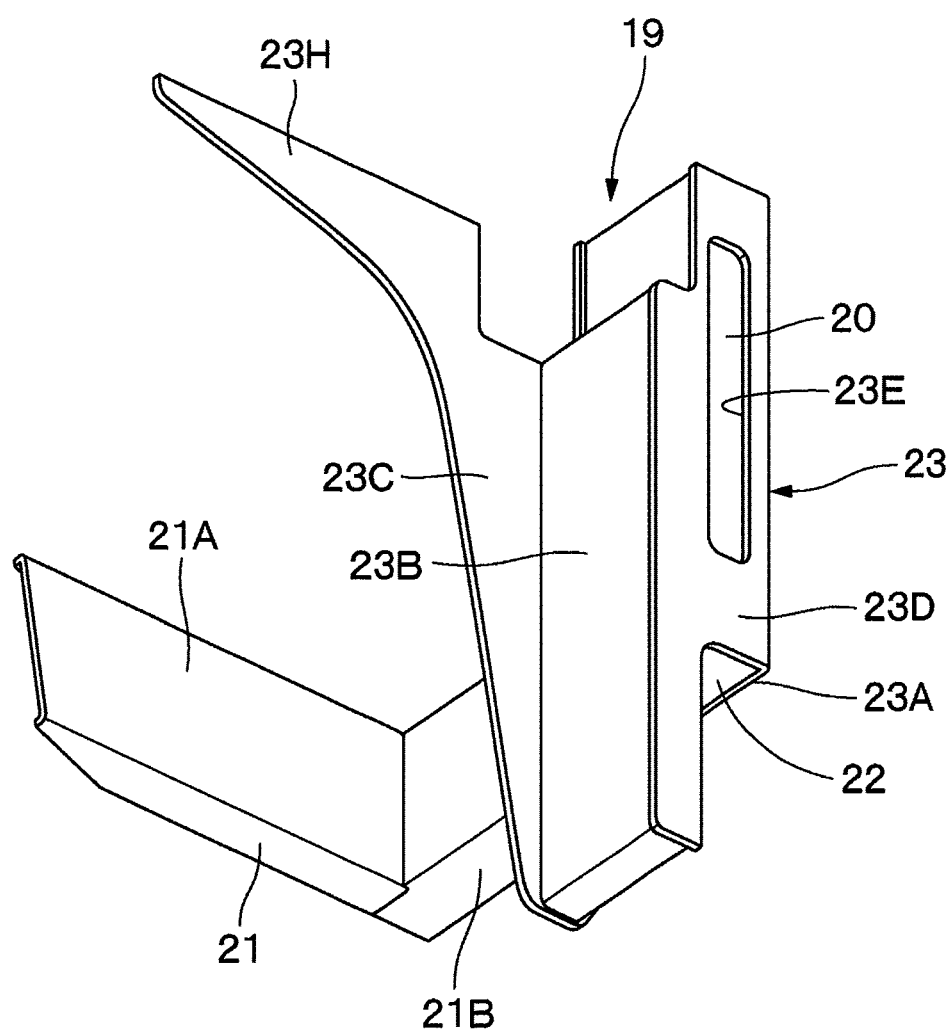
FIG. 14 is an external perspective view showing the suction duct as a single unit from the rear and lower side.

Indicated at 24 is an internal air filter attached facing the central front surface portion 10A2 in such a manner as to cover the internal air inlet port 10A3 of the front plate 10A constituting the operator's seat mounting section 10 of the floor member 9 (refer to FIG. 7, FIG. 12 and the like). The internal air filter 24 purifies air in the operator's room 17 (internal air) supplied through the suction duct 19 to the air conditioner unit 18.

Indicated at 25 is an external air filter attached in such a manner as to cover the external air inlet port 10E3 of the left surface plate 10E. The external air filter 25 purifies air outside of the operator's room 17 (external air) supplied through the suction duct 19 to the air conditioner unit 18.

Indicated at 26 is a discharge duct for air conditioning provided at the right side of the foot rest section 11 (refer to FIG. 4 and FIG. 5). The discharge duct 26 is connected to an outlet opening 18C of the air conditioner unit 18 to blow out conditioned air from the air conditioner unit 18 to a desired position in the operator's room 17.

Indicated at 27 is an outer cover provided on the revolving frame 5 to be positioned in the periphery of the cab box 16 (floor member 9) (refer to FIG. 2, FIG. 3, and FIG. 4). The outer cover 27 is constituted by an engine cover 27A capable of opening/closing, an engine left cover 27B and an engine right cover (not shown), a right tank cover 27C capable of opening/closing for accommodating various tanks (not shown), a left skirt cover 27D, a right skirt cover 27E, and the like. The engine left cover 27B facing the external air inlet port 10E3 provided in the left surface plate 10E in the operator's seat mounting section 10 is provided with a slit-shaped suction port 27B1 formed therein for introducing external air.

The hydraulic excavator 1 according to the present embodiment has the aforementioned construction, and next, an operation thereof will be explained.

An operator who boards at the operator's room 17 and sits on the operator's seat 13 operates the operating lever/pedal 15 for traveling, thus traveling the lower traveling structure 2. By operating the right or left operating lever 14 for working, the working mechanism 4 can be operated to perform an excavating operation of earth and sand, and the like.

At the aforementioned working, the air conditioner unit 18 is driven to improve the environment within the operator's room 17. At this point, the air conditioner unit 18 sucks in air in the operator's room 17 (internal air) through the internal air duct portion 20 and the common duct portion 22 in the suction duct 19, and cools the internal air by the evaporator in the casing 18A or heats it by the heater core to produce conditioned air. By blowing out the conditioned air through the discharge duct 26 or the like into the operator's room 17, the operator's room 17 can be adjusted to an appropriate temperature while suppressing penetration of outside odor or the like.

On the other hand, the air conditioner unit 18 sucks in air outside of the operator's room 17 (external air) through the external air duct portion 21 and the common duct portion 22 in the suction duct 19 and cools or heats the external air, thereby making it possible to adjust the operator's room 17 to an appropriate temperature by the conditioned air. At this time, fresh outside air can be supplied to the operator's room 17.

Further, as shown in FIG. 3, in a case of performing a maintenance operation of the control valve device 7 provided on the revolving frame 5, and the like, the floor member 9 tilts up in the rear side at the front side as a fulcrum together with the operator's seat 13, the cab box 16, the air conditioner unit 18, the suction duct 19 and the like, thus facilitating the maintenance operation of the control valve device 7 and the like.

In this manner, according to the present embodiment, the suction duct 19 provided in the operator's seat mounting section 10 of the floor member 9 is constituted by the internal air duct portion 20 connected to the internal air inlet port 10A3 of the front plate 10A, the external air duct portion 21 connected to the external air inlet port 10E3 of the left surface plate 10E, and the common duct portion 22 for connecting the internal air duct portion 20 and the external air duct portion 21 to the side of the blower fan 18B of the air conditioner unit 18. Further, the suction duct 19 forms the hollow column 23 having the hollow closed section structure by the internal air duct portion 20 and the common duct portion 22 integrally formed in the upper and lower directions.

Accordingly, since the internal air duct portion 20 and the common duct portion 22 are formed as the hollow column 23 of the hollow closed section structure, the hollow column 23 can connect the internal air inlet port 10A3 and the blower fan 18B of the air conditioner unit 18, and further, can increase the strength of the floor member 9 as a strong column.

Further, since the hollow column 23 is formed as the hollow closed section structure by the front surface plate 23A, the rear surface plate 23B, the left surface plate 23C, and the right surface plate 23D, the strength of the floor member 9 can be increased by attaching the hollow column 23 to the floor member 9. The hollow column 23 can circulate both of internal air flowing in from the internal air inlet bore 23E and external air flowing in from the external air inlet bore 23F inside the single hollow column, and can supply the air from the air outlet bore 23G to the air conditioner unit 18.

On the other hand, the external air duct portion 21 is constructed such that the groove members 21A and 21B each having a groove-shaped section configuration are attached to the front plate 10A and the left surface plate 10E of the operator's seat mounting section 10. In consequence, the external air duct portion 21 can be closed by the operator's seat mounting section 10 to form the hollow closed section structure. Therefore, the external air inlet port 10E3 and the suction side of the air conditioner unit 18 can be connected. Further, the strength of the floor member 9 can be increased with the hollow column 23.

In this manner, the single suction duct 19 can be provided with two functions of the original function as the duct for circulating air from the internal air inlet port 10A3 and the external air inlet port 10E3 toward the suction side of the air conditioner unit 18 and the function as the strength member for increasing the strength of the floor member 9.

As a result, for example, since members for reinforcing having being required for increasing the strength of the floor member can be eliminated, the space for providing the reinforcement members can be used as an arrangement space of the suction duct 19. In consequence, since the suction duct 19 can be arranged freely in a position suitable for use conditions, for example, in a position of being less likely to be affected by dusts or rain water, the limited space of the upper revolving structure 3 can be effectively used. In addition, since the components in number corresponding to the elimination of the members for reinforcing can be eliminated, an improvement of the assembling operability, downsizing and light-weighing of the upper revolving structure 3, and the like can be achieved.

The external air duct portion 21 can form the hollow closed section structure using the operator's seat mounting section 10 by attaching the first groove member 21A to the left surface plate 10E of the operator's seat mounting section 10 and attaching the second groove member 21B to the front plate 10A. Therefore, the left surface plate 10E and the front plate 10A of the operator's seat mounting section 10 can be used as a single surface forming the hollow closed section structure, thus the weight of the external air duct portion 21 can be reduced.

Further, the hollow column 23 constituting the suction duct 19 is provided with the extending portion 23H extending from the left surface plate 23C to the rear side to support the mounting plate 10B of the operator's seat mounting section 10 from the lower side. Therefore, the extending portion 23H can increase the strength of the mounting plate 10B on which large loads of the operator's seat 13, the respective operating levers 14, an operator, and the like are applied, to stably support these components.

On the other hand, since the suction duct 19 made of the strength members tilts with the floor member 9 at the time of tilting up or down the floor member 9, the strength of the floor member 9 against bending or twisting at the time of tilting can be increased.

Further, the internal air duct portion 20, the external air duct portion 21, and the common duct portion 22 constituting the suction duct 19 is formed by fixing and combining a plurality of metallic plates which have sufficient strength. Therefore, the suction duct 19 can form the air passage forming a hollow therein by itself or in combination with the operator's seat mounting section 10 of the floor member 9. In consequence, since the suction duct 19 can form the hollow closed section structure (boxy structure) by itself or in combination with the operator's seat mounting section 10, the strength of the floor member 9 can be increased with a simple construction.

It should be noted that the present embodiment is explained by taking a case where the floor member 9 can tilt up or down at the front position as a fulcrum to the revolving frame 5, as an example. However, the present invention is not limited to the same, and it may be applied, for example, to a hydraulic excavator of a type where the floor member is provided to be fixed to the revolving frame.

Further, in the above-described embodiment, it is explained by citing the cab-furnished type hydraulic excavator 1 equipped with the crawler type lower traveling structure 2 as the construction machine. However, the present invention is not limited to the same, and it may be applied to a hydraulic excavator or the like equipped with a wheel type lower traveling structure, for example.

DESCRIPTION OF REFERENCE NUMERALS

1: Hydraulic excavator (Construction machine)
2: Lower traveling structure
3: Upper revolving structure
4: Working mechanism
5: Revolving frame
9: Floor member
10: Operator's seat mounting section
10A: Front plate
10A3: Internal air inlet port
10B: Mounting plate
10E: Left surface plate
10E3: External air inlet port
11: Foot rest section
13: Operator's seat
16: Cab box
17: Operator's room
18: Air conditioner unit
18B: Blower fan (Suction side)
19: Suction duct
20: Internal air duct portion
21: External air duct portion
21A, 21B: Groove member
22: Common duct portion
23: Hollow column
23A: Front surface plate
23B: Rear surface plate
23C: Left surface plate
23D: Right surface plate
23E: Internal air inlet bore
23F: External air inlet bore
23G: Air outlet bore
23H: Extending portion

The invention claimed is:

1. A construction machine comprising: an automotive lower traveling structure; an upper revolving structure swingably mounted on said lower traveling structure; and a working mechanism liftably mounted to said upper revolving structure, wherein said upper revolving structure is provided with a revolving frame serving as a support structure, a floor member provided on said revolving frame and having an operator's seat mounting section at the rear side for mounting an operator's seat and having a foot rest section at the front side on which an operator rests his or her feet, a cab box provided to cover the periphery and the upper side of said floor member for forming an operator's room on said floor member, and an air conditioner unit provided at the lower surface side of said foot rest section to suck in internal air from an internal air inlet port opened inside of said operator's room or suck in external air from an external air inlet port opened outside of said operator's room for forming conditioned air which is supplied into said operator's room;

wherein a suction duct is provided in said operator's seat mounting section of said floor member for circulating air toward a suction side of said air conditioner unit from said internal air inlet port and said external air inlet port, said suction duct comprises an internal air duct portion connected to said internal air inlet port, an external air duct portion connected to said external air inlet port, and a common duct portion for connecting said internal air duct portion and said external air duct portion to the suction side of said air conditioner unit, said internal air duct portion is formed as a hollow column of a hollow closed section structure with said common duct portion formed integrally, said internal air duct portion and said common duct portion extend in the upper and lower directions, said external air duct portion of said suction duct has a U-shaped cross section, in which faces opposing said operator's seat mounting section of said floor member are open and attached to said operator's seat mounting section to form another hollow closed section structure with said operator's seat mounting section, said hollow closed section structure forms a strength member supporting said floor member together with said another hollow closed section structure formed of said external air duct portion and said operator's seat mounting section.

2. A construction machine according to claim 1, wherein said hollow column is provided with said hollow closed section structure formed by a front surface plate, a rear surface plate, a left surface plate, and a right surface plate, and said right surface plate is provided with an internal air inlet bore into which internal air flows, said left surface plate is provided with an external air inlet bore into which external air flows, and said front surface plate is provided with an air outlet bore at the lower side through which the internal air and the external air flow out.

3. A construction machine according to claim 1, wherein said operator's seat mounting section of said floor member includes a front plate extending from a rear portion of said foot rest section to an upper side and a mounting plate extending from an upper portion of said front plate to a rear side for mounting said operator's seat and said suction duct is provided with an extending portion extending from said internal air duct portion to a rear side for supporting said mounting plate from the lower side.

4. A construction machine according to claim 1, wherein said floor member is provided to be capable of tilting up and down to said revolving frame at a front side position as a tilting fulcrum, and said suction duct tilts together with said floor member.

\* \* \* \* \*